US012159654B1

United States Patent
Habibollahzadeh et al.

(10) Patent No.: US 12,159,654 B1
(45) Date of Patent: Dec. 3, 2024

(54) LOCAL EXTENSION OF HEAD OVERCOAT WITH A NEAR-FIELD TRANSDUCER EXTENDING TOWARD THE MEDIA-FACING SURFACE

(71) Applicant: Western Digital Technologies, Inc., San Jose, CA (US)

(72) Inventors: Mehdi Habibollahzadeh, San Jose, CA (US); Sukumar Rajauria, San Jose, CA (US); Qing Dai, San Jose, CA (US); Sudha Narayan, San Jose, CA (US); Krisda Siangchaew, Bangkok (TH); Nattaporn Khamnualthong, Pathumthani (TH)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/362,852

(22) Filed: Jul. 31, 2023

Related U.S. Application Data

(60) Provisional application No. 63/505,558, filed on Jun. 1, 2023.

(51) Int. Cl.
*G11B 11/10* (2006.01)
*G11B 5/31* (2006.01)
(Continued)

(52) U.S. Cl.
CPC .......... *G11B 5/3106* (2013.01); *G11B 5/4826* (2013.01); *G11B 5/4866* (2013.01);
(Continued)

(58) Field of Classification Search
CPC ..... G11B 5/4826; G11B 5/314; G11B 5/3106; G11B 13/088; G11B 2005/0021;
(Continued)

(56) References Cited

U.S. PATENT DOCUMENTS

| 8,902,720 B1 | 12/2014 | Schreck et al. |
| 9,036,307 B1 * | 5/2015 | Hoshiya ............... G11B 5/3903 360/59 |

(Continued)

FOREIGN PATENT DOCUMENTS

WO 2014197190 A1 12/2014

OTHER PUBLICATIONS

Anurup Datta and Xianfan Xu, "Improved Near Field Transducer Design for Heat Assisted Magnetic Recording," IEEE Transactions on Magnetics, vol. 52, Issue: 12, Dec. 2016.
(Continued)

*Primary Examiner* — Nabil Z Hindi

(57) ABSTRACT

A HAMR data storage device may include a magnetic media and a slider comprising: a main pole, a waveguide, and a near-field transducer (NFT) situated between the main pole and the waveguide, wherein an air-bearing surface (ABS) of the slider comprises a transparent overcoat layer situated over the main pole, the waveguide, and the NFT, and wherein the transparent overcoat layer has a particular thickness such that, during an operational phase of the HAMR data storage device, a gap between a media-facing surface of the transparent overcoat layer and the magnetic media is less than about 0.5 nm.

19 Claims, 8 Drawing Sheets

(51) Int. Cl.
  *G11B 5/48* (2006.01)
  *G11B 5/60* (2006.01)
  *G11B 13/08* (2006.01)
  *G11B 5/00* (2006.01)

(52) U.S. Cl.
  CPC ............ *G11B 5/6088* (2013.01); *G11B 13/08* (2013.01); *G11B 2005/0021* (2013.01)

(58) Field of Classification Search
  CPC ......... G11B 5/6088; G11B 5/40; G11B 7/122; G11B 11/10506; G11B 11/1051; G11B 5/31; G11B 11/105; G11B 5/3912; G11B 5/1278; G11B 5/255
  USPC .......................................................... 360/59
  See application file for complete search history.

(56) References Cited

U.S. PATENT DOCUMENTS

| | | |
|---|---|---|
| 9,412,402 B2 | 8/2016 | Cheng et al. |
| 9,460,738 B1 | 10/2016 | Torres et al. |
| 9,552,833 B2 | 1/2017 | Cheng et al. |
| 9,659,587 B1 | 5/2017 | Khamnualthong et al. |
| 10,083,713 B1 * | 9/2018 | Simmons ................. G11B 5/40 |
| 10,395,678 B1 | 8/2019 | Rajauria et al. |
| 10,614,850 B1 | 4/2020 | Jones et al. |
| 10,629,236 B1 | 4/2020 | Liu et al. |
| 10,950,267 B1 | 3/2021 | Aoki et al. |
| 11,127,421 B1 * | 9/2021 | Siangchaew ........... G11B 13/08 |
| 2003/0228497 A1 | 12/2003 | Wu et al. |
| 2017/0221511 A1 | 8/2017 | Dai et al. |
| 2018/0197568 A1 | 7/2018 | Rajauria et al. |

OTHER PUBLICATIONS

N. Dwivedi et al., "Graphene overcoats for ultra-high storage density magnetic media," Nature Communications, 2021, 12:2854, https://doi.org/10.1038/s41467-021-22687-y.

* cited by examiner

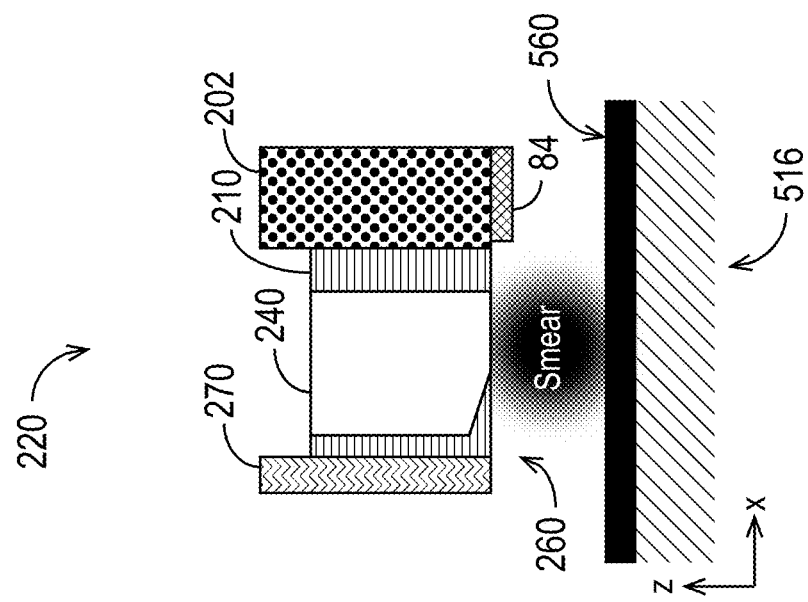
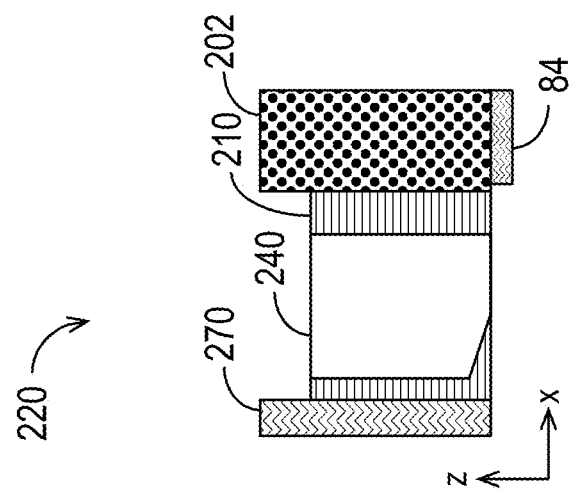
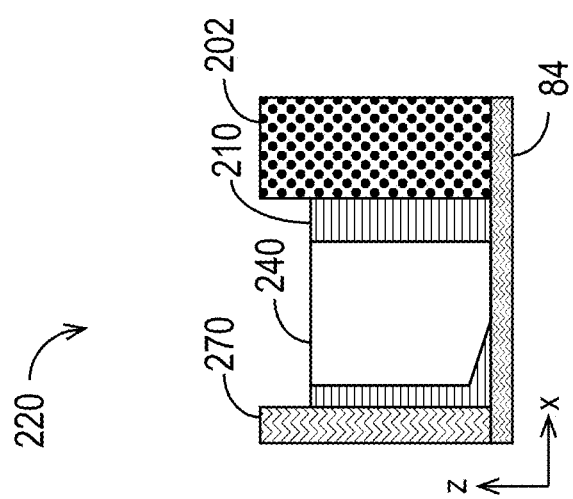

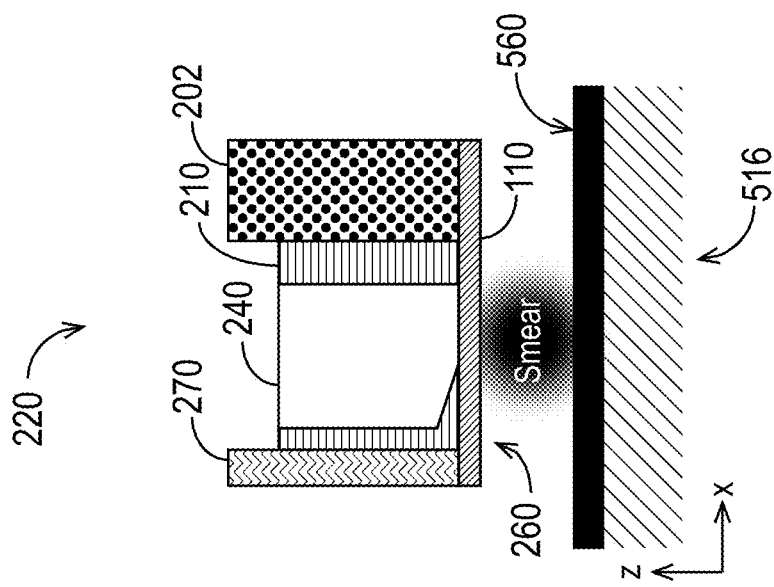
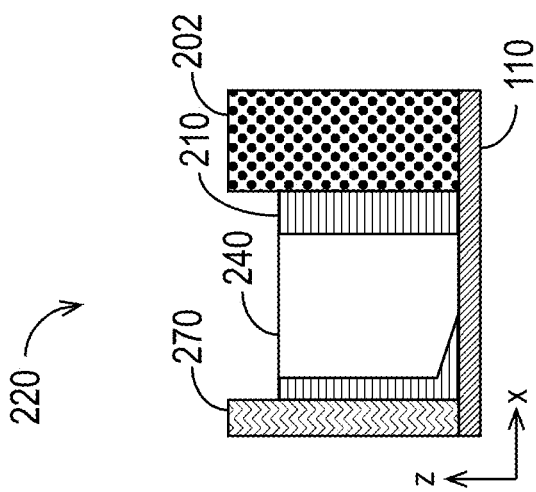
FIG. 3B
FIG. 3A

LOCAL EXTENSION OF HEAD OVERCOAT WITH A NEAR-FIELD TRANSDUCER EXTENDING TOWARD THE MEDIA-FACING SURFACE

CROSS-REFERENCE TO RELATED APPLICATIONS

This application claims the benefit of, and hereby incorporates by reference in its entirety for all purposes, U.S. provisional application No. 63/505,558, filed Jun. 1, 2023 and entitled "LOCAL EXTENSION OF HEAD OVERCOAT WITH A NEAR-FIELD TRANSDUCER EXTENDING TOWARD THE MEDIA-FACING SURFACE".

BACKGROUND

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, may result in a requirement for write heads that incorporate higher magnetic moment materials, or techniques such as perpendicular recording (or both).

An additional solution has been proposed, which uses heat to lower the effective coercivity of a localized region on the magnetic media surface and writes data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR). The term "HAMR" is used herein to refer to all of TAR, TAMR, EAMR, and HAMR.

In HAMR, a magnetic recording material with high magneto-crystalline anisotropy (Ku) is heated locally during writing to lower the coercivity enough for writing to occur, but the coercivity/anisotropy is high enough that the recorded bits are thermally stable at the ambient temperature of the disk drive (i.e., the normal operating or "room" temperature of approximately 15-30 degrees Celsius). In some proposed HAMR systems, the magnetic recording material is heated to near or above its Curie temperature. The recorded data may then be read back at ambient temperature by a conventional magnetoresistive read head. HAMR disk drives have been proposed for both conventional continuous media, wherein the magnetic recording material is a continuous layer on the disk, and for bit-patterned media (BPM), in which the magnetic recording material is patterned into discrete data islands or "bits."

One type of HAMR disk drive uses a laser source and an optical waveguide coupled to a near-field transducer (NFT) for heating the recording material on the disk. A "near-field" transducer refers to "near-field optics," wherein light is passed through a first element with subwavelength features and the light is coupled to a second element, such as a substrate (e.g., of a magnetic recording medium), located a subwavelength distance from the first element. The NFT is typically located at the air-bearing surface (ABS) of an air-bearing slider that also supports the read/write head and rides or "flies" above the disk surface. The NFT may have a generally triangular output end, such that an evanescent wave generated at a surface of the waveguide couples to surface plasmons excited on the surface of the NFT, and a strong optical near-field is generated at the apex of the triangular output end. Other NFT shapes are also possible.

Because of its function, the NFT can reach high temperatures, which, if left uncorrected or continuing for too long a period of time, can cause HAMR drive failures.

Many data storage devices, such as hard disk drives, operate in a standard air (e.g., nitrogen, oxygen, and water vapor mixture) atmosphere. Spinning disks in hard disk drives at high revolutions per minute against the friction of an air atmosphere is largely inefficient and requires a certain amount of power. As an alternative, data storage devices, such as hard disk drives, can be filled with a lower-density gas, such as helium, and sealed to control and maintain the device's internal environment. Sealing mitigates or prevents leakage of internal gases from within the storage device. The use of helium, which has a density that is approximately one-seventh that of air, reduces friction and vibration in the device, thereby creating less drag and turbulence. Consequently, by running the hard disk drive in a less-dense atmosphere, such as an atmosphere of helium or a helium mixture, friction on the disk is reduced, thereby causing the disk to require less power in order to spin at a similar rate as the disks in drives that operate in standard air conditions. The use of helium also reduces the operating temperature of the drive, as well as noise generated by the drive.

The lower ambient pressure in sealed helium drives poses challenges to ABS designs, however. For example, the intensive heating used in HAMR can cause desorption of organic gas phase contaminants and lubricant molecules on the media surface, and then accumulation of those materials at the NFT area. The material buildup, known as smear, has been found to form around the NFT. Smear accumulation can affect the reliability of the NFT and also can cause head-disk interface issues, such as touchdown power changes in the drive.

Therefore, there is a need for solutions that mitigate the effects of smear in the write head and, in particular, in the NFT area of a HAMR write head.

SUMMARY

This summary represents non-limiting embodiments of the disclosure.

The present disclosure generally relates to slider ABS designs that substantially eliminate the gap between the writer portion of a read/write head and the surface of the media to substantially prevent smear, while leaving the distance between the rest of the read/write head and the surface of the media substantially the same. The disclosed configurations mitigate or prevent the formation of smear, thereby improving the lifespan of the NFT and data storage device, without requiring the design of the read portion of the read/write head to be modified.

In some aspects, the techniques described herein relate to a heat-assisted magnetic recording (HAMR) data storage device, the HAMR data storage device including: a magnetic media and a slider, where the slider includes: a main pole; a waveguide; and a near-field transducer (NFT) situated between the main pole and the waveguide, wherein an air-bearing surface (ABS) of the slider includes a transparent overcoat layer situated over the main pole, the waveguide, and the NFT, and wherein the transparent overcoat layer has a particular thickness such that, during an operational phase of the HAMR data storage device, a gap between a media-facing surface of the transparent overcoat layer and the magnetic media is less than about 0.5 nm.

In some aspects, the particular thickness of the transparent overcoat layer is between about 0.5 nm and about 3 nm.

In some aspects, the slider further includes a read head. In some aspects, the ABS of the slider further includes a protective layer over the read head. In some aspects, the protective layer includes diamond-like carbon (DLC). In some aspects, a thickness of the protective layer is less than the particular thickness of the transparent overcoat layer. In some aspects, a difference between the particular thickness of the transparent overcoat layer and the thickness of the protective layer is between approximately 0.1 nm and approximately 5 nm. In some aspects, the selected thickness of the transparent overcoat layer is between about 0.5 nm and about 3 nm.

In some aspects, the gap between the media-facing surface of the transparent overcoat layer and the magnetic media is greater than zero.

In some aspects, the transparent overcoat layer consists essentially of silicon nitride.

In some aspects, the HAMR data storage device further includes a processor configured to execute one or more machine-executable instructions that, when executed, cause the processor to: detect or estimate the gap between the media-facing surface of the transparent overcoat layer and the magnetic media; and adjust or set a fly height of the slider based at least in part on the gap between the media-facing surface of the transparent overcoat layer and the magnetic media.

In some aspects, the techniques described herein relate to a heat-assisted magnetic recording (HAMR) data storage device, the HAMR data storage device including: a magnetic media; a slider including a write head and a transparent overcoat layer situated over the write head, the transparent overcoat layer having a selected thickness; and a processor configured to execute one or more machine-executable instructions that, when executed, cause the slider to fly over the magnetic storage media at a fly height that substantially eliminates a gap between a media-facing surface of the transparent overcoat layer and the magnetic media.

In some aspects, the selected thickness of the transparent overcoat layer is between about 0.5 nm and about 3 nm.

In some aspects, the slider further includes a read head. In some aspects, the slider further includes a protective layer over the read head. In some aspects, the protective layer includes diamond-like carbon (DLC). In some aspects, a thickness of the protective layer is less than the selected thickness of the transparent overcoat layer. In some aspects, the selected thickness of the transparent overcoat layer is between about 0.5 nm and about 3 nm.

In some aspects, a difference between the selected thickness of the transparent overcoat layer and the thickness of the protective layer is between approximately 0.1 nm and approximately 5 nm.

In some aspects, the gap between the media-facing surface of the transparent overcoat layer and the magnetic media is greater than zero.

In some aspects, the transparent overcoat layer consists essentially of silicon nitride.

BRIEF DESCRIPTION OF THE DRAWINGS

Objects, features, and advantages of the disclosure will be readily apparent from the following description of certain embodiments taken in conjunction with the accompanying drawings in which:

FIG. 2B is an illustration of an example of a write portion of a HAMR read/write head with the protective layer intact.

FIG. 2C illustrates the write portion of the HAMR read/write head of FIG. 2B after a portion of the protective layer has worn off as the data storage device operates.

FIG. 2D illustrates smear situated between the write portion of the HAMR read/write head and the magnetic media after the protective layer has worn off around the NFT.

FIG. 3A is an illustration of an example of a write portion with a transparent overcoat layer to mitigate smear in HAMR data storage devices.

FIG. 3B illustrates smear formed between the magnetic media and the transparent overcoat layer under the tip of the NFT.

Figure 1:
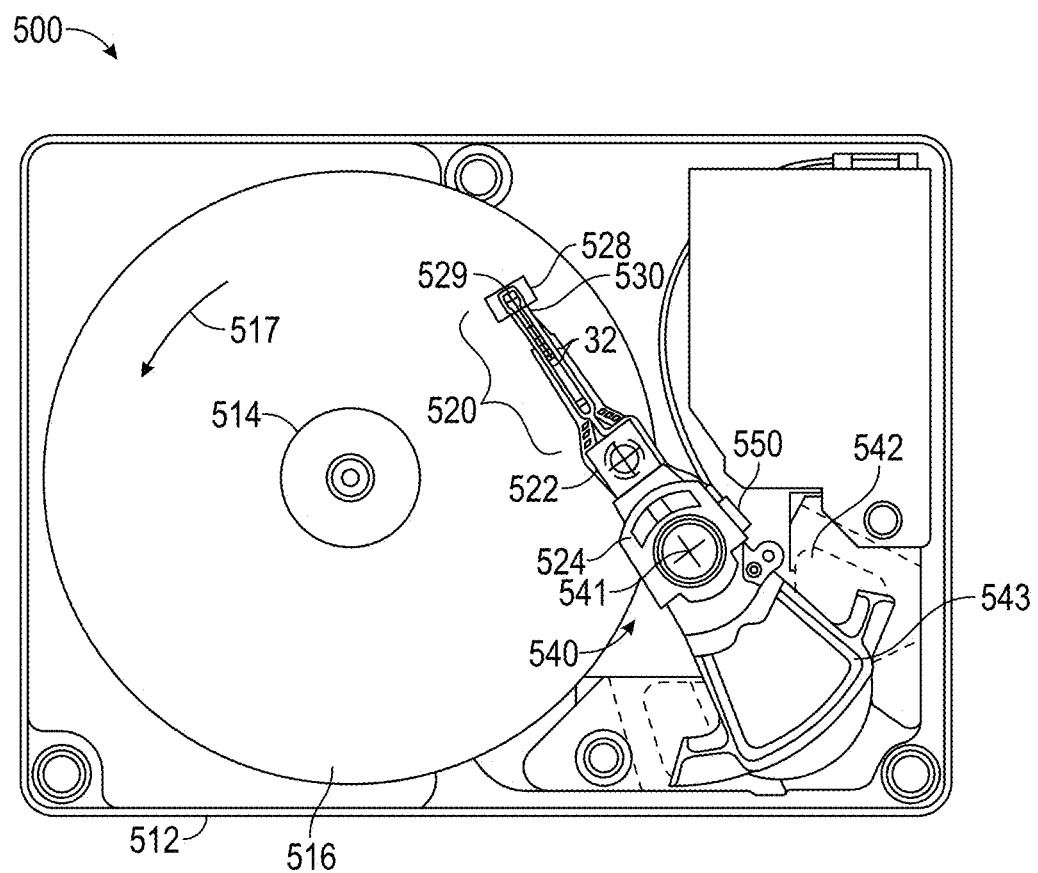
FIG. 1 is a top view of an example of a data storage device into which the disclosed embodiments can be incorporated.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

The following description is made for the purpose of illustrating the general principles of the present disclosure and is not meant to limit the inventive concepts claimed herein. Furthermore, particular features described herein can be used in combination with other described features in various possible combinations and permutations.

FIG. 1 is a top view of an example of a data storage device 500 (e.g., a HAMR data storage device) into which the disclosed embodiments can be incorporated. FIG. 1 illustrates a head/disk assembly of the data storage device 500 with the cover removed. The data storage device 500 includes a rigid base 512 supporting a spindle 514 that supports at least one magnetic media 516. The spindle 514 is rotated by a spindle motor (not shown), which, in operation, rotates the at least one magnetic media 516 in the direction shown by the curved arrow 517. The data storage device 500 has at least one load beam assembly 520 having an integrated lead suspension (ILS) or flexure 530 with an array 32 of electrically conductive interconnect traces or lines. The at least one load beam assembly 520 is attached to rigid arms 522 connected to an E-shaped support structure, sometimes called an E-block 524. The flexure 530 is attached to a slider 528. A read/write head 529 for recording to a magnetic media 516 is located at the end or trailing surface of the slider 528. The read/write head 529 may include embodiments described herein.

As the magnetic media 516 rotates, the magnetic media 516 drags gas (which may be air, helium, etc.) under the slider 528 in a direction approximately parallel to the tangential velocity of the magnetic media 516. The slider 528 has a media-facing air-bearing surface (ABS) that causes the slider 528 to ride on a cushion or bearing of gas, typically air or helium, generated by rotation of the magnetic media 516. (It is to be understood that the term "air-bearing surface (ABS)" is used herein to refer to the gas-bearing surface of a slider, regardless of whether the gas within the drive is air or another gas (e.g., helium) or a mixture of gases.) As the air or gas passes under the slider 528 ABS, compression of the air or gas along the air flow path causes the air pressure between the magnetic media 516 and the slider 528 to increase, which creates a hydrodynamic lifting force that counteracts the tendency of the at least one load beam assembly 520 to push the slider 528 toward the magnetic media 516. The slider 528 thus flies above the magnetic media 516 but in close proximity to the surface of the magnetic media 516. The flexure 530 enables the slider 528 to "pitch" and "roll" on the air (or gas) bearing generated by the magnetic media 516 as it rotates.

The separation or spacing between the slider 528 and the surface of the magnetic media 516 while the slider 528 flies is called the fly height. The flying dynamics of the slider 528, and thus the fly height, are influenced by factors such as the rotation speed of the magnetic media 516, the aerodynamic shape of the ABS of the slider 528, the load force applied to the slider 528 by the components to which it is attached, and the pitch and roll torques applied to the slider 528 by the at least one load beam assembly 520 and/or flexure 530.

A data storage device 500 may include thermal fly-height control (TFC). One type of TFC uses an electrically-resistive heater located on the slider 528 near the read/write head 529. When current is applied to the heater, the heater expands and causes the read/write head 529 to expand and thus move closer to the surface of the magnetic media 516. The read/write head 529 can be adjusted to different heights, depending on whether the data storage device 500 is reading or writing. Also, the heater can maintain the read/write head 529 at an optimal or near-optimal fly-height even in the presence of factors (e.g., pitching, rolling) that could otherwise cause changes in the fly-height. The TFC heater can be calibrated using the value of heater power that results in onset of slider-media contact or "touchdown."

To sense touchdown, the slider 528 may include an embedded contact sensor (ECS) embedded in the slider 528 near the read/write head 529. The ECS may comprise a metallic strip located at the ABS of the read/write head 529. In such a configuration, the resistance of the ECS may change in response to temperature changes. Thus, the voltage across the ECS can be used to sense touchdown as the slider 528 temperature changes as the slider 528 comes in close proximity to the magnetic media 516. Methods, devices, and systems for sensing touchdown and for TFC are described, for example, in U.S. Pat. No. 10,395,678 to Rajauria et al., which was filed on Dec. 6, 2018, issued on Aug. 27, 2019, and is hereby incorporated by reference in its entirety for all purposes.

The data storage device 500 of FIG. 1 also includes a rotary actuator assembly 540 rotationally mounted to the rigid base 512 at a pivot point 541. The rotary actuator assembly 540 may include a voice coil motor (VCM) actuator that includes a magnet assembly 542 fixed to the rigid base 512 and a voice coil 543. When energized by control circuitry (not shown), the voice coil 543 moves and thereby rotates E-block 524 with the rigid arms 522 and the at least one load beam assembly 520 to position the read/write head over the data tracks on the magnetic media 516. The array 32 of electrically conductive interconnect traces or lines connects at one end to the read/write head 529 and at its other end to read/write circuitry contained in an electrical module or chip 550, which, in the data storage device 500 of FIG. 1, is secured to a side of the E-block 524. The chip 550 includes a read/write integrated circuit (R/W IC). The chip 550 may include a processor (e.g., as part of the R/W IC or external to it).

The read/write head 529 includes a write head, which, in the embodiments disclosed herein, comprises a HAMR head that includes an inductive write head, an NFT, and an optical waveguide. (As stated previously, the term "HAMR" as used herein refers to all variants of thermally-assisted recording, including TAR, TAMR, EAMR, and HAMR.) A semiconductor laser with a wavelength of 780 to 980 nm may be used as the HAMR light source. The laser may be supported on the top of the slider 528, or it may be located on the flexure 530 and coupled to the slider 528 by an optical channel. As the magnetic media 516 rotates in the direction of the curved arrow 517, the movement of the rotary actuator assembly 540 allows the HAMR head on the slider 528 to access different data tracks on the magnetic media 516. The slider 528 is typically formed of a composite material, such as a composite of alumina/titanium-carbide ($Al_2O_3$/TiC). FIG. 1 illustrates only one magnetic media 516 surface with the slider 528 and read/write head 529, but there may be multiple magnetic media 516 stacked on a hub that is rotated by a spindle motor, with a separate slider 528 and read/write head 529 associated with each surface of each magnetic media 516.

In operation, after the voice coil 543 has positioned the read/write head 529 over the data tracks on the magnetic media 516, the read/write head 529 may be used to write information to one or more tracks on the surface of the magnetic media 516 and to read previously-recorded information from the tracks on the surface of the magnetic media 516. The tracks may comprise discrete data islands of magnetizable material (e.g., bit-patterned media), or the magnetic media 516 may have a conventional continuous magnetic recording layer of magnetizable material. Processing circuitry in the data storage device 500 (e.g., on the chip 550) provides to the read/write head 529 signals representing information to be written to the magnetic media 516 and receives from the read/write head 529 signals representing information read from the magnetic media 516.

To read information from the magnetic media 516, the read/write head 529 may include at least one read sensor. The read sensor(s) in the read/write head 529 may include, for example, one or more giant magnetoresistance (GMR) sensors, tunneling magnetoresistance (TMR) sensors, or another type of magnetoresistive sensor. When the slider 528 passes over a track on the magnetic media 516, the read/ write head 529 detects changes in resistance due to magnetic field variations recorded on the magnetic media 516, which represent the recorded bits.

Figure 2A:
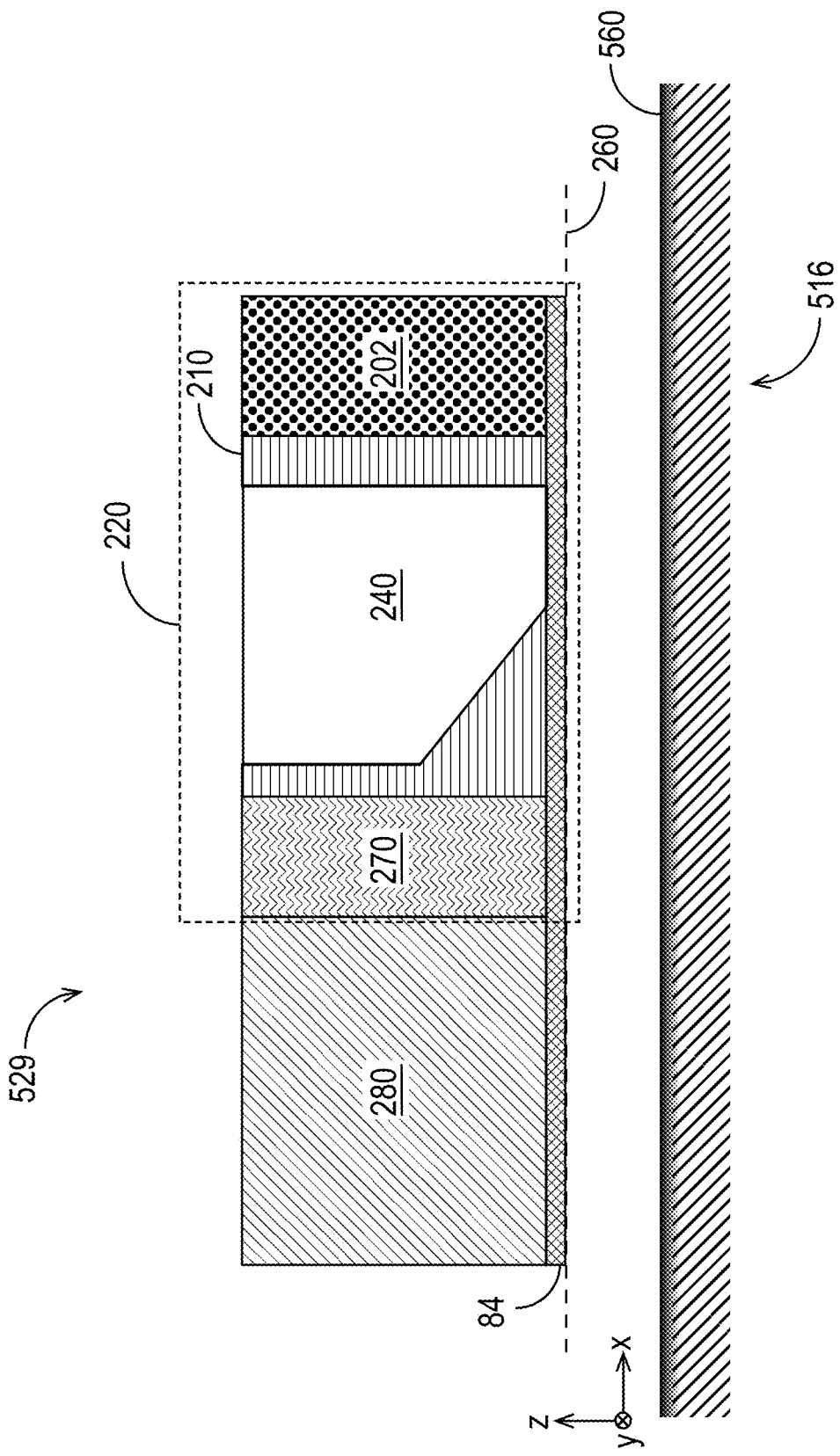
FIG. 2A illustrates portions of a HAMR read/write head in a slider for reading data from and writing data to a magnetic media.

FIG. 2A illustrates portions of a HAMR read/write head 529 that could be included in the slider 528 described above in the discussion of FIG. 1 to read data from and write data to a magnetic media 516. The HAMR read/write head 529 can be used to write to the magnetic recording layer 560 of a magnetic media 516. FIG. 2A shows x-, y-, and z-axes for reference. The view in FIG. 2A is of a cross-section of the HAMR read/write head 529 in the x-z plane, with the magnetic media 516 shown below the HAMR read/write head 529. With the axes as defined in FIG. 2A, the data tracks on the magnetic media 516 reside in an x-y plane.

The portion of the HAMR read/write head 529 example shown in FIG. 2A comprises a write portion 220 (which may also referred to as a write head) and a read portion 280 (which may also be referred to as a read head). As shown in FIG. 2A, the write portion 220 and the read portion 280 of the HAMR read/write head 529 are covered at the ABS 260 by a protective layer 84. As is known in the art, when the HAMR read/write head 529 is manufactured, the protective layer 84 may be applied to the ABS 260 to protect the write portion 220 and the read portion 280. The protective layer 84 may be, for example, a thin layer of a diamond-like carbon (DLC) or a similar material. The protective layer 84 may be provided to reduce friction and wear on the slider 528 to improve the reliability and lifespan of the data storage device 500. The protective layer 84 can also reduce degradation and corrosion of components of the slider 528. As described further below, however, some or all of the protective layer 84 can wear off as the data storage device 500 operates.

The read portion 280 may include any suitable components for reading the magnetic media 516, such as one or more of the read sensors described above in the discussion of FIG. 1.

In FIG. 2A, the write portion 220 comprises a main pole 202, cladding 210, an NFT 240, and a waveguide 270. It is to be appreciated that an implementation of a write portion 220 may include components or elements (e.g., material layers, such as adhesion layers, etc.) not illustrated in FIG. 2A, and that some of the components included in a write portion 220 can be different (e.g., in position, characteristics, etc.) than shown in the example of FIG. 2A.

As is known in the art, the main pole 202 creates magnetic fields that allow the magnetic recording layer 560 of the magnetic media 516 to be written to. The main pole 202 may be made of any suitable material (e.g., a magnetic material such as iron, cobalt, nickel, a combination of two or more of these materials, etc.). Such materials are known in the art and are not discussed further herein.

The write portion 220 also includes a waveguide 270. As is known in the art, a waveguide is a structure used to guide and propagate electromagnetic waves, such as microwaves or light, along a path with low energy loss. In some embodiments, the waveguide 270 is configured to receive radiation at a wavelength from a laser source and transmit the radiation at that wavelength to the NFT 240. Waveguides for use in HAMR are known in the art and are not described further herein.

The NFT 240, which is situated between the main pole 202 and the waveguide 270, is made of a material with high thermal stability, such as a plasmonic metal (e.g., gold, silver, aluminum, copper, ruthenium, rhodium, palladium, platinum, iridium, or alloys or combinations thereof). The NFT 240 may have, for example, a generally trapezoidal shape.

The cladding 210 may be provided to protect the main pole 202 from thermal damage due to the operation of the write portion 220, and also to electrically isolate the NFT 240 from the main pole 202. The cladding 210 may be made of a material or combination of materials with high thermal conductivity to dissipate heat generated during the write process and mitigate damage to the main pole 202. Such materials, which include, for example, silicon dioxide, are known in the art and are not described further herein.

In a HAMR data storage device (e.g., a data storage device 500), excessive heating of the NFT 240 can cause performance degradation and eventually failure of the device. One possible cause of failure due to excessive heating may be due to adsorption of carbonaceous material on the protective layer 84 (of, e.g., DLC) near the tip of the NFT 240 (e.g., referring to FIG. 2A, at or near the ABS 260). Hydrocarbon molecules from the magnetic media 516 overcoat and lubricant can also become mobile at elevated temperatures and adsorb on the ABS 260. Over time, these molecules can form a "smear" that absorbs power from the laser source and causes the NFT 240, which normally operates at very high temperatures, to become even hotter than usual. Smear can also block light from the light (e.g., laser) source, thereby reducing the amount by which the magnetic media 516 is heated for the write process. Smear can be particularly problematic in sealed helium drives.

FIG. 2B is an illustration of an example of a write portion 220 with the protective layer 84 intact (e.g., when the data storage device 500 is first placed into service or is early in its service life). As the data storage device 500 operates, hot smear can wear out part of the protective layer 84, such as at and around the NFT 240 tip, thereby creating what may be referred to as a carbon combustion hole (CCH) around the tip of the NFT 240. FIG. 2C illustrates the cross-section of the write portion 220 after a portion of the protective layer 84 has worn off around the NFT 240 as the data storage device 500 operates (e.g., due to the presence of hot smear).

FIG. 2D illustrates how the CCH of FIG. 2C can lead to degradation of the NFT 240. FIG. 2D shows smear situated between the write portion 220 and the magnetic media 516 after the protective layer 84 has worn off around the NFT 240. In the circumstance shown in FIG. 2D, heat can transfer from the smear to the NFT 240, which can result in diffusion of the NFT metal until the tip of the NFT 240 deforms and recording performance degrades, eventually possibly leading to failure of the HAMR data storage device.

An alternative to using a material such as DLC at the ABS 260 to protect the write portion 220 of the read/write head 529 is to use a durable transparent (glassy) material (e.g., $SiO_2$, NO, etc.). U.S. Pat. No. 11,127,421 to Siangchaew et al., which was filed on Feb. 8, 2021, issued on Sep. 21, 2021, and is hereby incorporated by reference in its entirety for all purposes, describes the use an optically transparent protective film over some or all of the write portion 220 at the ABS 260. The light used by the write portion 220 to heat the magnetic media 516 can penetrate the transparent material at the ABS 260 without heating it, which can allow the desired heating of the magnetic media 516 to be provided while preventing excessive heating of the NFT 240. Moreover, because the transparent material is durable, it does not wear out like DLC does. The use of a transparent material to protect the write portion 220 can substantially improve the lifetime of the NFT 240.

FIG. 3A is an illustration of an example of a write portion 220 with a transparent overcoat layer 110 made from a transparent (glassy) material to protect the NFT 240 from some of the effects of smear. The transparent overcoat layer 110 may be, for example, an optically transparent protective film, such as described in U.S. Pat. No. 11,127,421. As shown in FIG. 3A, the write portion 220 is covered at the ABS 260 by a transparent overcoat layer 110.

Although the use of the transparent overcoat layer 110, such as shown in FIG. 3A and described further in U.S. Pat. No. 11,127,421, can significantly reduce failures of HAMR data storage devices, it does not prevent smear from forming. FIG. 3B illustrates that even with the use of a transparent overcoat layer 110, smear can still form between the magnetic media 516 and the transparent overcoat layer 110 under the tip of the NFT 240, which can reduce the overall effectiveness of the write portion 220 such as, for example, by preventing light from reaching the magnetic media 516 and/or transferring heat to the NFT 240. Therefore, although the use of a transparent overcoat layer 110 addresses some of the adverse effects of smear, it does not prevent smear from forming around the tip of the NFT 240.

The inventors of the present disclosure recognized that the lifetime of the NFT 240 could be improved significantly if the deleterious effects of smear were eliminated altogether. The inventors had the insight that smear itself could be largely eliminated by substantially eliminating the gap between the ABS 260 of the write portion 220 and the magnetic media 516 so that smear cannot form, or the amount of smear that can form has a negligible effect on the performance of the data storage device 500. The inventors recognized, however, that attempting to reduce the gap between the write portion 220 and the magnetic media 516 by reducing overall the fly height of the slider 528 would likely cause other performance issues, such as media crashes that would likely result due to the slider 528 pitching and rolling as it flies.

Accordingly, the inventors recognized that it would be desirable to find a way to modify the ABS 260 around the write portion 220 to reduce the gap between the write portion 220 and the magnetic media 516 without requiring a change to the fly height of the slider 528 or changes to the operation of other components of the slider 528, such as, for example, the read portion 280. The inventors had the insight that the gap could be substantially eliminated by making the transparent overcoat layer 110 over the write portion 220 thicker to bring the write portion 220 closer to the magnetic media 516 without causing the performance and/or durability issues that would result from reducing the slider 528 fly height. Because the transparent overcoat layer 110 is transparent, the thicker transparent overcoat layer 110 does not adversely affect heating of the magnetic media 516.

Therefore, embodiments disclosed herein aim to reduce the effects of smear on data storage device 500 performance and NFT 240 lifetime by substantially eliminating the gap between the write portion 220 of the read/write head and the magnetic media 516 without requiring a change to the fly height of the slider 528. For example, the gap between the write portion 220 and the magnetic media 516 can be reduced to between about 0.1 nm and about 5 nm while substantially maintaining the gap between the read portion 280 and the magnetic media 516. Because the gap between the write portion 220 and the magnetic media 516 is substantially eliminated, smear buildup at the tip of the NFT 240 is also substantially eliminated (e.g., because the amount of smear that can form is small and/or whatever small amount of smear that does form is kept a larger distance away from the NFT 240 by the thicker transparent overcoat layer 110), thereby improving the lifetime of the NFT 240 and the data storage device 500.

In some embodiments, one design objective is to reduce the gap between the write portion 220 and the magnetic media 516 as much as possible (thereby substantially eliminating it) while still maintaining reliability by avoiding crashes and damage to the magnetic media 516. Using the disclosures herein, the gap between the write portion 220 and the magnetic media 516 can be substantially eliminated without affecting the distance between other portions of the slider 528, such as the read portion 280, and the magnetic media 516. Therefore, the effects of smear can be substantially eliminated and the NFT 240 lifetime increased.

Figure 4B:
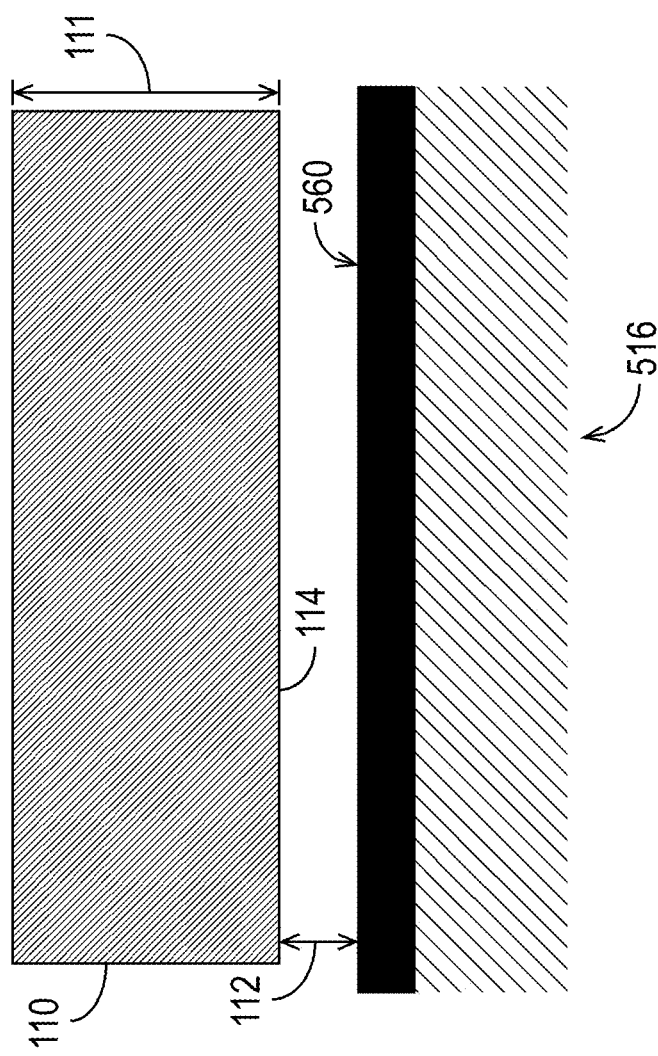
FIG. 4B is a closer view of the transparent overcoat layer and the magnetic media surface of FIG. 4A in accordance with some embodiments.
Figure 4A:
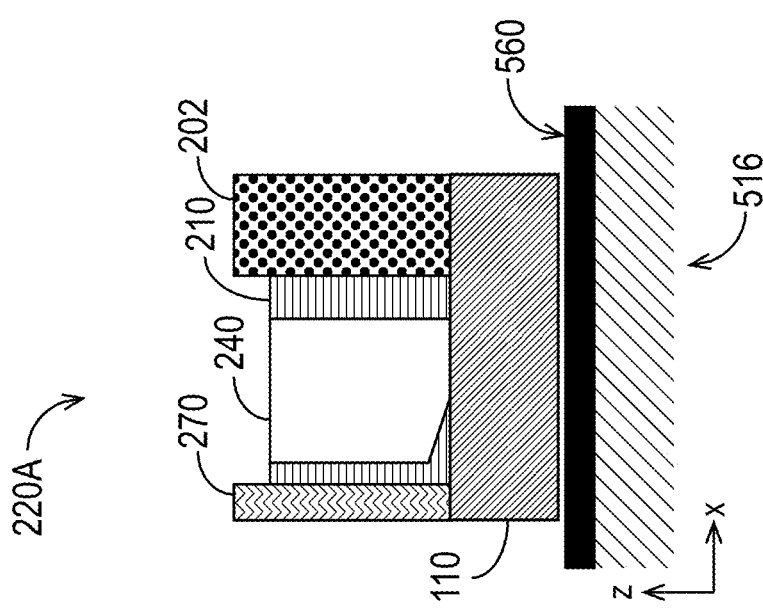
FIG. 4A shows a write portion of a HAMR read/write head in accordance with some embodiments.

FIG. 4A shows a write portion 220A of a HAMR read/write head in accordance with some embodiments. As illustrated, the write portion 220A comprises a main pole 202, cladding 210, an NFT 240, and a waveguide 270. These components were described above in the discussion of FIG. 2A. That description also applies to the like components in FIG. 4A and is not repeated. As explained elsewhere herein, it is to be appreciated that an implementation of a write portion 220A may include components or elements (e.g., material layers) not illustrated in FIG. 4A, and that some of the components can be different than shown in the example of FIG. 4A.

As shown in FIG. 4A, the write portion 220A is covered at the ABS 260 by a transparent overcoat layer 110. The transparent overcoat layer 110 may be a transparent (glassy) material as described above in the discussion of FIGS. 3A and 3B. The transparent overcoat layer 110 may be, for example, an optically transparent protective film, such as described in U.S. Pat. No. 11,127,421.

The transparent overcoat layer 110 may be made from any durable material that is sufficiently optically transparent to allow the write portion 220A to write to the magnetic recording layer 560 of the magnetic media 516. The transparent overcoat layer 110 may be made from any suitable material that provides transparency at the electromagnetic wavelength in use, mitigates or prevents oxidation of the write pole, and provides durability as the write portion 220A operates. It is to be understood that "transparency" means that the transparent overcoat layer 110 is substantially transparent to radiation at the wavelength (or wavelengths) produced by the light source coupled to the waveguide 270 and propagated by the waveguide 270 to the NFT 240. The transparent overcoat layer 110 may be transparent to some wavelengths and not transparent (or less transparent) to others. The transparent overcoat layer 110 may comprise an oxide (e.g., silicon dioxide) and/or a nitride (e.g., silicon nitride). As specific examples, the transparent overcoat layer 110 may comprise one or more of: $Si_3N_4$, $TiO_2$, $ZrO_2$, $HfO_2$, $Nb_2O_5$, $Ta_2O_5$, $Sc_2O_3$, $Y_2O_3$, MgO, SiN, BN, SiBN, and/or SiBNC. In some embodiments, the transparent overcoat layer 110 consists essentially of silicon nitride, which has a good combination of optical transparency and thermal oxidation resistance.

The transparent overcoat layer 110 shown in the example of FIG. 4A is thicker than the transparent overcoat layer 110 shown in FIGS. 3A and 3B. FIG. 4B is a closer view (not to scale) of the transparent overcoat layer 110 and the magnetic media 516 surface to show the gap 112 between the media-facing surface 114 of the transparent overcoat layer 110 and the magnetic media 516. As explained above and discussed further below (e.g., in the discussion of FIG. 5A), the thickness 111 of the transparent overcoat layer 110 is selected (e.g., during the process of designing the slider 528 and the data storage device 500) to substantially eliminate the gap 112, and, therefore, the formation of smear, between the write portion 220A and the magnetic media 516. In some embodiments, the thickness 111 of the transparent overcoat layer 110 is selected so that the gap 112 between the media-facing surface 114 and the magnetic media 516 is less than about 0.5 nm, which has been found to substantially eliminate smear.

There are multiple ways to determine that the gap 112 has been substantially eliminated (in which case smear is also substantially eliminated). For example, thermal detection can be used as the NFT 240 operates. As explained above, the presence of smear causes the temperature of the NFT 240 to rise. A temperature sensor near the NFT 240 can be used to detect NFT 240 temperature increases, and these temperature increases can be attributed to smear buildup. When the gap 112 has been substantially eliminated, there is either a minimal or no temperature increase as the NFT 240 operates, or whatever temperature increase that does occur is small enough not to be problematic for the ongoing operation of the NFT 240 (e.g., the temperature does not rise more than a specified amount). Those having ordinary skill in the art will understand how to determine, based an NFT 240 having a particular design and characteristics, what an acceptable temperature increase is. This acceptable temperature increase can be used to determine whether smear has been substantially eliminated (in which case the gap 112 has also been substantially eliminated).

Another way to determine that a selected gap 112 and smear have been substantially eliminated is through physical inspection during testing. The spacing between the NFT 240 and the magnetic media 516 can be set, and the height of any smear that collects while the write portion 220A operates can be measured (e.g., using atomic force microscopy (AFM)). A maximum smear height can be established by a person having ordinary skill in the art in view of the disclosures herein (e.g., taking into account the design of the NFT 240 and its behavior as smear builds up), and if the measured smear height during testing is less than the established maximum smear height, it can be determined that smear has been substantially eliminated, which means the gap 112 has also been substantially eliminated.

Physical inspection and temperature monitoring can be used together to determine whether smear has been substantially eliminated. For example, the maximum smear height can be the height of smear buildup that is measured when the temperature of the NFT 240 increases by no more than a threshold value, which can be determined by a person having ordinary skill in the art based on factors such as durability targets, design of the NFT 240, etc. Upon determining that smear has been substantially eliminated, it can be determined that the gap 112 has also been substantially eliminated.

The thickness 111 of the transparent overcoat layer 110 can be selected so that it substantially eliminates the formation of smear between the write portion 220A and the magnetic media 516 without adversely affecting the flying characteristics or other components of the slider 528. For example, the read portion 280 can remain at its same distance from the magnetic media 516, and the read portion 280 can continue to be protected by a different type of protective layer 84 (e.g., DLC or a similar material). In some embodiments, the thickness 111 of the transparent overcoat layer 110 is between about 0.5 nm and about 3 nm.

Figure 5A:
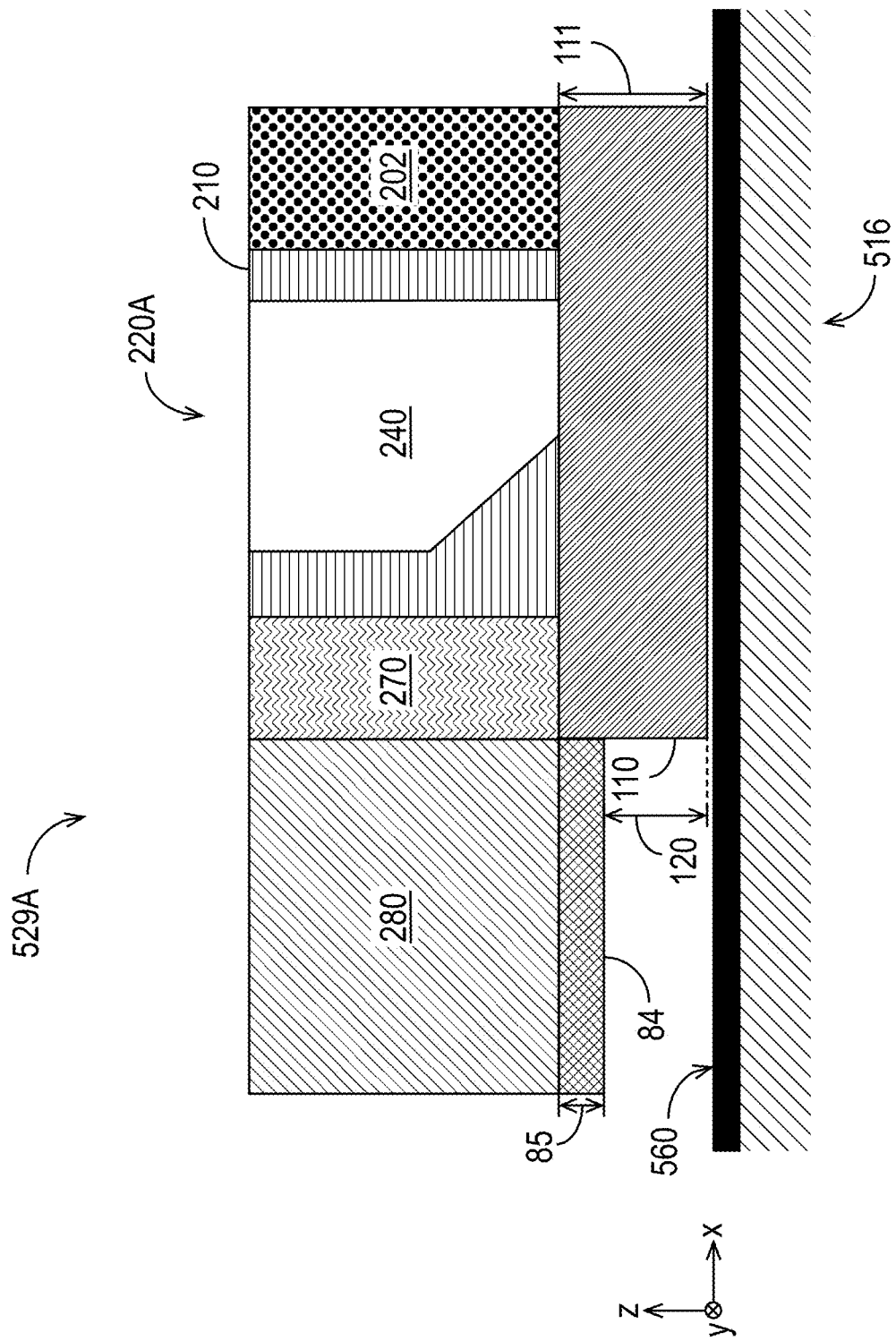
FIG. 5A illustrates a HAMR read/write head in accordance with some embodiments.

FIG. 5A illustrates a HAMR read/write head 529A in accordance with some embodiments. FIG. 5A includes many of the same components described above in the discussion of the HAMR read/write head 529 of FIG. 2A (e.g., read portion 280, waveguide 270, cladding 210, NFT 240, main pole 202). Those descriptions also apply the like components of FIG. 5A and are not repeated here.

As shown in FIG. 5A, the write portion 220A includes a transparent overcoat layer 110 with a thickness 111, and the read portion 280 is protected by a protective layer 84 that has a thickness 85. The difference between the thickness 111 and the thickness 85 is the thickness difference 120. Stated another way, the transparent overcoat layer 110 extends beyond the protective layer 84, closer to the magnetic media 516 surface, by the thickness difference 120.

Figure 5B:
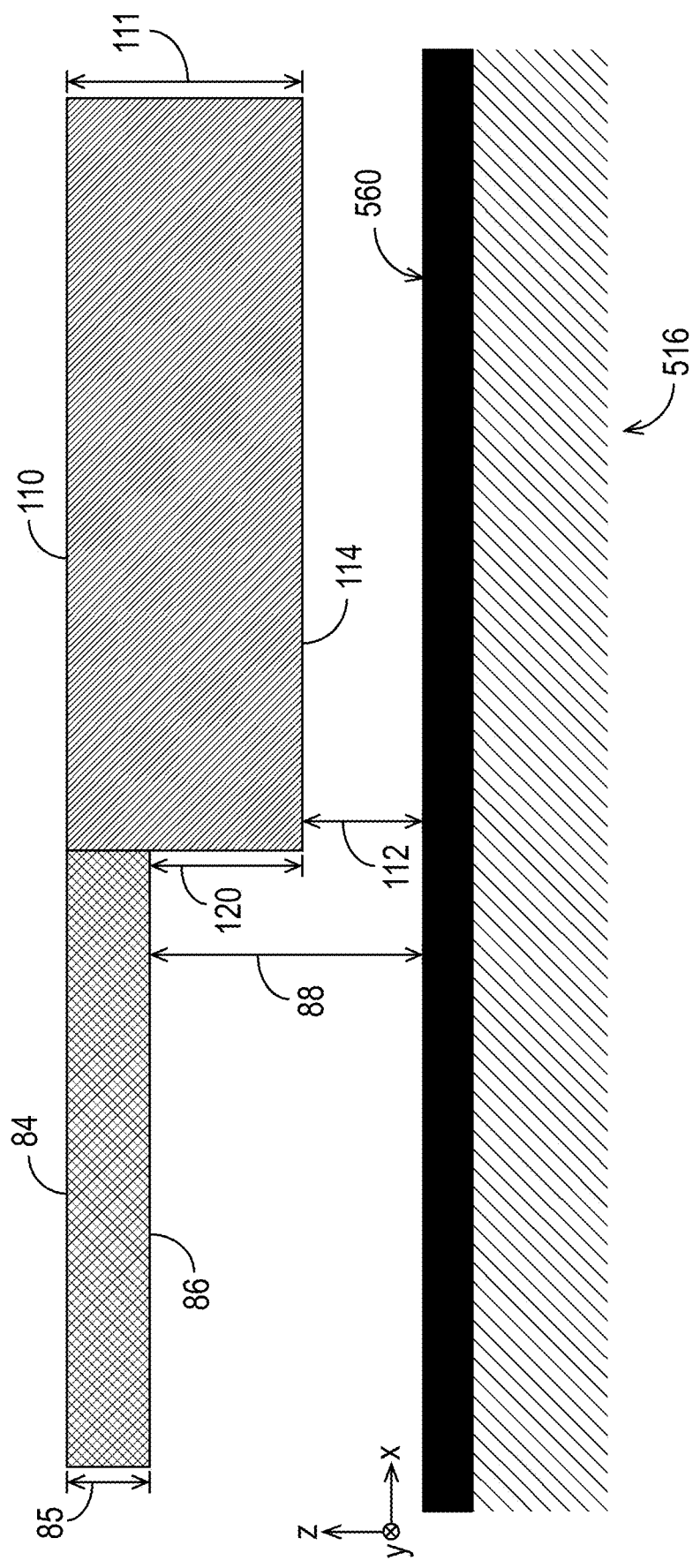
FIG. 5B is a closer view of the protective layer, the transparent overcoat layer, and the magnetic media surface from FIG. 5A in accordance with some embodiments.

FIG. 5B is a closer view (not to scale) of the protective layer 84, the transparent overcoat layer 110, and the magnetic media 516 surface from FIG. 5A. As described above, the transparent overcoat layer 110 has a thickness 111. The transparent overcoat layer 110 has a media-facing surface 114, which, when the data storage device 500 operates, is separated from the magnetic media 516 by a gap 112 (e.g., less than about 0.5 nm).

As FIG. 5B also illustrates, the protective layer 84 has a thickness 85, which is less than the thickness 111. The thickness 85 may be, for example, between about 0.5 nm and about 3 nm. As a result, a media-facing surface 86 of the protective layer 84 and the magnetic media 516 are separated by a gap 88, where the gap 88 is greater than the gap 112. The difference between the gap 88 (between the media-facing surface 86 of the protective layer 84 and the magnetic media 516) and the gap 112 (between the media-facing surface 114 of the transparent overcoat layer 110 and the magnetic media 516) is the thickness difference 120. The thickness difference 120 may be, for example, between about 0.1 nm and about 5 nm. Stated another way, the thickness 111 of the transparent overcoat layer 110 is the thickness difference 120 greater than the thickness 85 of the protective layer 84. In some embodiments, therefore, the thickness 111 is between about 0.1 nm and about 5 nm larger than the thickness 85.

As explained above, the thickness 111 can be selected to substantially eliminate the gap 112 and, therefore, the formation of smear between the write portion 220A and the magnetic media 516. In some embodiments, the thickness 111 is selected so that the gap 112 is less than about 0.5 nm. It will be appreciated that the thickness 111 is a design parameter for the slider 528 design. Selection of the thickness 111 during the design process is well within the level of ordinary skill in the art in light of the disclosures herein.

In some embodiments, the fly height of the slider 528 is adjusted while the data storage device 500 operates. As explained above, the slider 528 may include additional components and sensors to allow the fly height to be adjusted. For example, the slider 528 may include at least one embedded contact sensor (ECS) or a component that provides a similar functionality. The ECS may, for example, detect the distance between the slider 528 and the magnetic media 516 based on mechanical vibration of the slider 528. The fly-height of the slider 528 can be adjusted based on inputs from the ECS to attempt to optimize performance while avoiding contact with the magnetic media 516. For example, temperature changes sensed by an ECS may be used as an indicator of contact and/or near contact between the slider 528 and the magnetic media 516. An ECS may sense physical contact of the slider 528 with the magnetic media 516 based on the ECS's resistance, e.g., the amount of voltage across the ECS, which is affected by the temperature change caused by such physical contact or proximity.

The slider 528 may also include a TFC element, which, as explained above, may be a heater that heats the portion of the slider 528 on which the HAMR read/write head 529A is mounted to reduce the distance between the HAMR read/write head 529A and the magnetic media 516 as the slider 528 flies over the magnetic media 516. A TFC element supplies the heater with electric current to generate heat that causes the portion of the slider 528 on which the HAMR read/write head 529A is mounted to protrude by thermal expansion. A TFC element can be used to adjust the gap 112 during an operational phase of the data storage device 500 (e.g., when the slider 528 flies over the magnetic media 516).

Like the read and write elements of the HAMR read/write head 529A, these additional elements (e.g., ECS, TFC, etc.) of the slider 528, if present, can be controlled through signals (e.g., currents) generated by electronics in the data storage device 500, such as, for example, the R/W IC described above in the explanation of FIG. 1 or another component.

Figure 6:
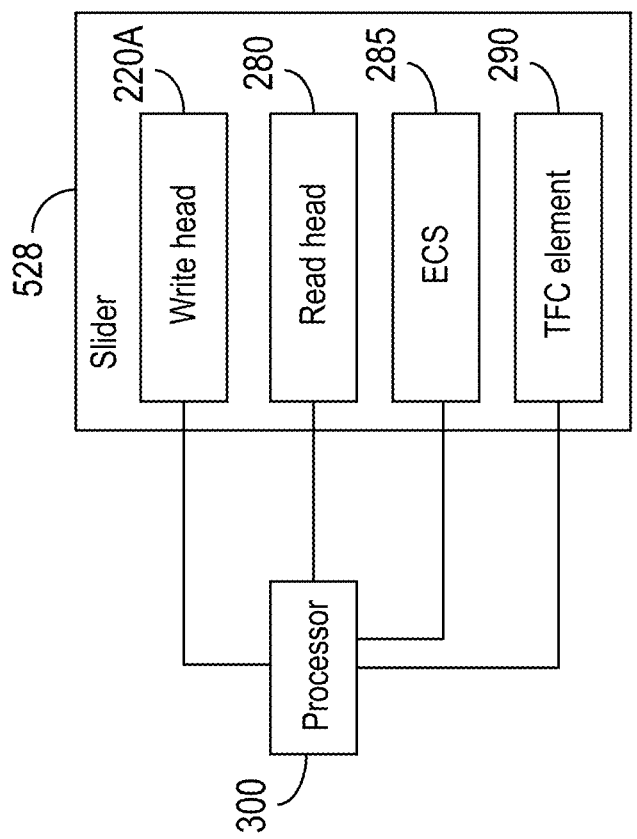
FIG. 6 is a diagram showing some components of a data storage device in accordance with some embodiments.

FIG. 6 is a diagram showing some components of a data storage device 500 in accordance with some embodiments. In some embodiments, the data storage device 500 includes a processor 300 (e.g., in the R/W IC or elsewhere in the data storage device 500) that is communicatively coupled to various components of a slider 528, including a write portion 220A, a read portion 280, an ECS 285, and a TFC element 290. In some embodiments, the processor 300 is configured to execute machine-executable instructions when the data storage device 500 operates (e.g., during an operational phase, such as when the slider 528 is flying over the magnetic media 516). For example, the instructions, when executed, may cause the processor 300 to control (e.g., adjust or set) the fly height of the slider 528.

Figure 7:
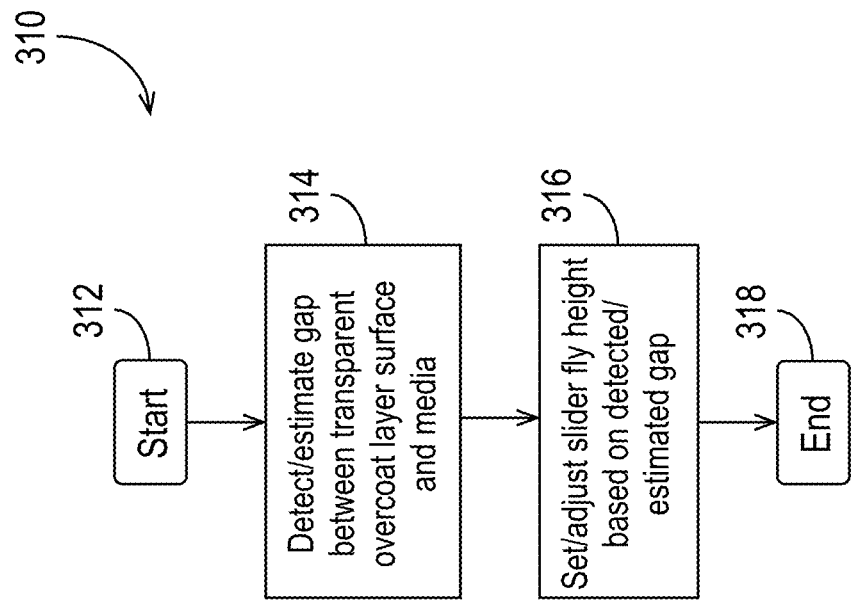
FIG. 7 is a flow diagram illustrating how machine-executable instructions cause the processor to control the fly height of the slider during an operational phase of a data storage device in accordance with some embodiments.

FIG. 7 is a flow diagram illustrating how machine-executable instructions cause the processor 300 to control the fly height of the slider 528 during an operational phase of the data storage device 500 in accordance with some embodiments. The process 310 begins at box 312. At box 314, the instructions cause the processor 300 to detect or estimate the fly height of the slider 528. For example, the processor 300 can interrogate a sensor of the slider 528 (e.g., the ECS 285) that detects the fly height and/or contact with the magnetic media 516, from which the processor 300 can determine (e.g., detect or estimate) the gap 112. At box 316, the instructions cause the processor 300 to control (e.g., adjust or set) the fly height of the slider 528 based at least in part on the determined gap 112. As a result, the machine-executable instructions executed by the processor 300 cause the slider 528 to fly at a fly height that substantially eliminates the gap 112. For example, as a result of executing the instructions, the processor 300 may control the slider 528 so that the gap 112 is less than about 0.5 nm, or so that smear is substantially eliminated. At box 318, the process 310 ends.

The benefits of the disclosed transparent overcoat layer 110 have been verified repeatedly in experiments that showed that the use of the techniques described herein effectively eliminate NFT 240 failures after prolonged use of the data storage device 500. For example, it was found that after 1 hour of operation of a data storage device 500 under a specified set of operational conditions, there was a 100% failure rate when the data storage device 500 used a write portion 220 configuration such as shown in FIG. 2B. In contrast, after 1 hour of operation of a data storage device 500 under the same set of operational conditions, there were no failures when the data storage device 500 used a write portion 220A configuration such as illustrated in FIG. 4A. Accordingly, the efficacy of the disclosed techniques has been verified.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. Describing the gap 112 between the media-facing surface 114 and the magnetic media 516 as "substantially eliminated" means that the gap 112 is small enough to be effectively zero, such that smear either does not form between the media-facing surface 114 and the magnetic media 516, or the amount of smear that forms is small enough that its effect on NFT 240 performance is negligible. As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A heat-assisted magnetic recording (HAMR) data storage device, the HAMR data storage device comprising:
   a magnetic media; and
   a slider comprising:
      a main pole;
      a waveguide; and
      a near-field transducer (NFT) situated between the main pole and the waveguide,
   wherein an air-bearing surface (ABS) of the slider comprises a transparent overcoat layer situated over the main pole, the waveguide, and the NFT, and
   wherein the transparent overcoat layer has a particular thickness such that, during an operational phase of the HAMR data storage device, a gap between a media-facing surface of the transparent overcoat layer and the magnetic media is less than about 0.5 nm.

2. The HAMR data storage device recited in claim 1, wherein the particular thickness of the transparent overcoat layer is between about 0.5 nm and about 3 nm.

3. The HAMR data storage device recited in claim 1, wherein the slider further comprises a read head.

4. The HAMR data storage device recited in claim 3, wherein the ABS of the slider further comprises a protective layer over the read head.

5. The HAMR data storage device recited in claim 4, wherein the protective layer comprises diamond-like carbon (DLC).

6. The HAMR data storage device recited in claim 4, wherein a thickness of the protective layer is less than the particular thickness of the transparent overcoat layer.

7. The HAMR data storage device recited in claim 6, wherein the particular thickness of the transparent overcoat layer is between about 0.5 nm and about 3 nm.

8. The HAMR data storage device recited in claim 6, wherein a difference between the particular thickness of the transparent overcoat layer and the thickness of the protective layer is between approximately 0.1 nm and approximately 5 nm.

9. The HAMR data storage device recited in claim 1, wherein the gap between the media-facing surface of the transparent overcoat layer and the magnetic media is greater than zero.

10. The HAMR data storage device recited in claim 1, wherein the transparent overcoat layer consists essentially of silicon nitride.

11. The HAMR data storage device recited in claim 1, further comprising a processor configured to execute one or more machine-executable instructions that, when executed, cause the processor to:
   detect or estimate the gap between the media-facing surface of the transparent overcoat layer and the magnetic media; and
   adjust or set a fly height of the slider based at least in part on the gap between the media-facing surface of the transparent overcoat layer and the magnetic media.

12. A heat-assisted magnetic recording (HAMR) data storage device, the HAMR data storage device comprising:
   a magnetic media;
   a slider comprising:
      a write head, and
      a transparent overcoat layer situated over the write head, the transparent overcoat layer having a selected thickness; and
   a processor configured to execute one or more machine-executable instructions that, when executed, cause the slider to fly over the magnetic media at a fly height that substantially eliminates smear buildup between a media-facing surface of the transparent overcoat layer and the magnetic media,
   wherein the selected thickness of the transparent overcoat layer is between about 0.5 nm and about 3 nm.

13. The HAMR data storage device recited in claim 12, wherein the slider further comprises a read head.

14. The HAMR data storage device recited in claim 13, wherein the slider further comprises a protective layer over the read head.

15. The HAMR data storage device recited in claim 14, wherein the protective layer comprises diamond-like carbon (DLC).

16. The HAMR data storage device recited in claim 14, wherein a thickness of the protective layer is less than the selected thickness of the transparent overcoat layer.

17. The HAMR data storage device recited in claim 16, wherein a difference between the selected thickness of the transparent overcoat layer and the thickness of the protective layer is between approximately 0.1 nm and approximately 5 nm.

18. The HAMR data storage device recited in claim 12, wherein a gap between the media-facing surface of the transparent overcoat layer and the magnetic media is greater than zero.

19. The HAMR data storage device recited in claim 12, wherein the transparent overcoat layer consists essentially of silicon nitride.

* * * * *